United States Patent
Yamamoto et al.

[11] 3,980,390
[45] Sept. 14, 1976

[54] OPTICAL TRANSMISSION FIBER

[75] Inventors: Yutaka Yamamoto, Osaka; Munetaka Kawaguchi, Nagoya, both of Japan

[73] Assignee: Sumitomo Electric Industries, Ltd., Osaka, Japan

[22] Filed: Mar. 20, 1975

[21] Appl. No.: 560,055

[30] Foreign Application Priority Data
Mar. 20, 1974  Japan.................................. 49-31961
Feb. 28, 1975  Japan.................................. 50-25280

[52] U.S. Cl............................ 350/96 WG; 350/96 B
[51] Int. Cl.²............................................. G02B 5/14
[58] Field of Search ............. 350/96 WG, 96 B, 320

[56] References Cited
UNITED STATES PATENTS

| | | | |
|---|---|---|---|
| 3,434,774 | 3/1969 | Miller | 350/96 WG |
| 3,703,690 | 11/1972 | Ravenscroft et al. | 350/96 WG |
| 3,869,194 | 3/1975 | Shiraishi et al. | 350/96 WG |

FOREIGN PATENTS OR APPLICATIONS

| | | | |
|---|---|---|---|
| 1,155,795 | 6/1969 | United Kingdom | 350/96 WG |

*Primary Examiner*—John K. Corbin
*Assistant Examiner*—Stewart Levy
*Attorney, Agent, or Firm*—Sughrue, Rothwell, Mion, Zinn and Macpeak

[57] ABSTRACT

An optical transmission fiber which is formed by applying and baking a liquid resin composition or a solution or a dispersion prepared by dissolving or dispersing in a solvent a liquid or solid resin composition onto a glass fiber for optical transmission and, further, coating thereover by melt extrusion a thermoplastic resin composition.

10 Claims, 8 Drawing Figures

OPTICAL TRANSMISSION FIBER

BACKGROUND OF THE INVENTION

1. Field of the Invention

The present invention relates to an improved optical transmission fiber suitably used for optical communication.

2. Description of the Prior Art

As optical communication systems employed in the case of communicating using coherent light such as a laser, there are a beam guide system, a space transmission system, and a system using an optical transmission fiber. The optical transmission fiber of this invention belongs to the type used in the last system among the aforesaid three optical communication systems.

Figure 1:
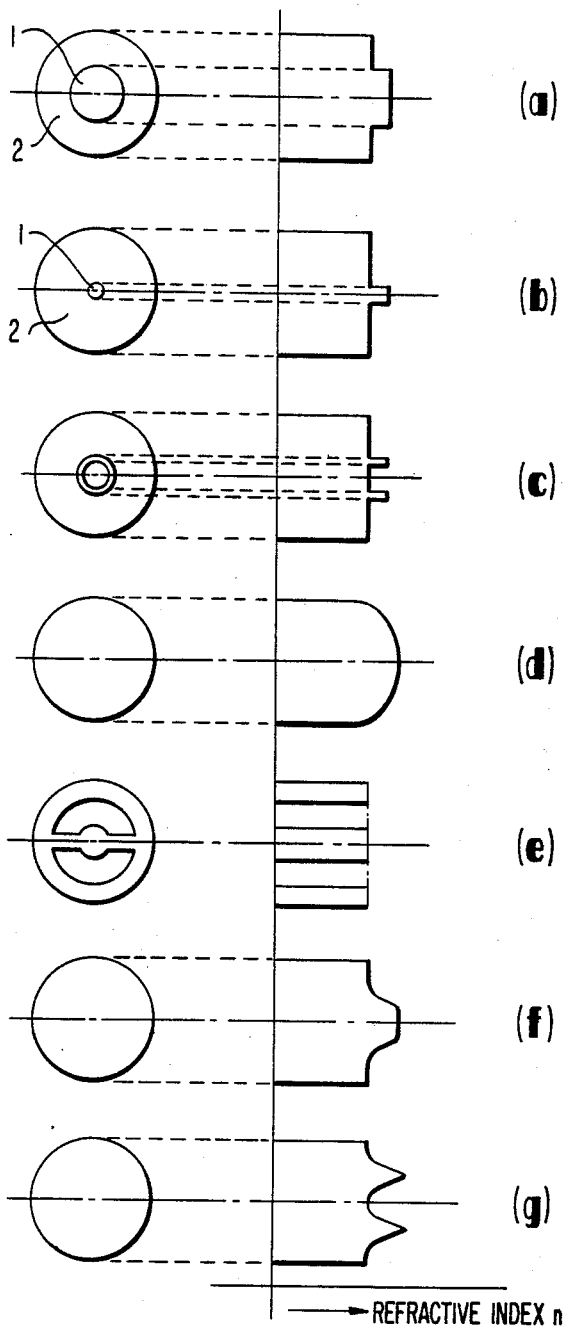

The optical transmission fibers which have been proposed at present are illustrated in FIG. 1 of the accompanying drawings, and includes (a) a clad type multimode optical fiber, (b) a clad type single-mode optical fiber, (c) an O-guide type optical fiber, (d) a self focussing type optical fiber, (e) a single material type optical fiber and combinations of them, for example, (f) a clad type having, in part, gradually varying refractive index and (g) an O-guide type of the similar construction. FIG. 1 shows, respectively, cross sectional view and the refractive index distribution of each of the types.

As the material for optical transmission fibers, glass and in particular those comprising quartz glass as a basic component are preferable from the point of optical loss at present.

However, an optical transmission line composed of a glass can not be used as it is for practical purposes as an optical transmission line (referred to hereinafter as an optical glass fiber) for the following reasons.

A. Firstly, in the optical fiber made of a glass, the elongation at break is quite low, the bending radius at break is quite large, and also it is quite low in strength to impact shock and twisting. Furthermore, although the tensile strength thereof can be rather high on the average but much derivations in the tensile strength exist and the minimum value of the tensile strength is quite low. Therefore, such an optical fiber has a large fault in that the fiber is, as whole, very fragile, is poor in flexibility, and will be broken even by a slight deformation. Moreover, during the manufacturing of the optical fiber or in the course of handling it thereafter, defects such as fine cracks are easily formed on the surface of the fiber and thus if an external force or deformation is applied to the defect-bearing portion, stress is concentrated upon the defect portion, which results in an acceleration of the tendency of the fiber to break. Accordingly, such an optical fiber is not resistant to the external force or deformation occurring during cable production using the optical glass fiber individually or by combining a plurality of them or during the laying operation of the cable of the optical glass fibers.

B. Secondly, the optical glass fiber used for optical communication must be very transparent, that is, the sources which may cause absorption and scattering of light must be removed from the material as completely as possible. Defects such as fine cracks formed on the surface of the optical glass fiber causes scattering of leaking light, which results in adverse influences to a large extent on the optical communication.

C. Thirdly, if leaking light is totally reflected at the outermost surface of an optical fiber and returns to the central core or if light enters the central core from the outside, noise occurs in the optical communication and thus it is desired to minimize the leaking light from returning to the inside of the optical fiber by leading the leaking light to the outside by some means or to prevent the entrance of external light into the inside as much as possible.

D. Fourthly, for example, in the aforesaid clad type optical fiber shown in FIG. 1, it is impossible to focus or concentrate the light energy completely in core 1 and the rest of the light energy enters clad 2. If core 1 is an ideally transparent body to light, no difficulties occur. However, usually small impurities are present in core 1 or the interface between core 1 and clad 2 is slightly uneven, which causes scattering of light. Such scattered light causes light to leak. In using a single optical glass fiber, such difficulty can be avoidable by releasing the scattered light into surrounding space but in making a cable using a plurality of optical glass fibers, the scattered light can enter the adjacent optical glass fibers and thus the scattered light must be trapped.

Although optical glass fibers have very excellent optical transmission properties, it is impossible to put them to practical use because of the foregoing disadvantages (A), (B), (C) and (D).

An object of this invention is therefore to provide an optical transmission glass fiber which is not accompanied by any of the disadvantages (A), (B), (C) and (D) as described above.

DESCRIPTION OF THE ACCOMPANYING DRAWINGS

Figure 2:
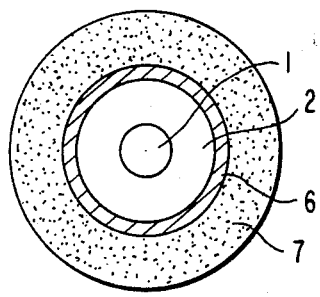

FIGS. 1 (a), (b), (c), (d), (e), (f), (g), respectively show cross sections of optical transmission glass fibers and distributions of the refrative indexes therealong according to the present invention; and FIG. 2 is a cross section of an optical transmission fiber.

DESCRIPTION OF THE INVENTION

In order to overcome the disadvantages described above, the inventors have studied the covering of the optical glass fibers with thermo-plastic resin composition by means of melt extrusion and, as a result, found that those resins having adhesion to glass such as polyethylene, polypropylene, fluorinated ethylenepropylene copolymer and the like have little effect for improving the mechanical strength of the optical glass fibers and, therefore, provide no fundamental solution for aforesaid problems. Resins such as polyamides, polyesters and the likes having polar or functional groups in the molecules and therefore excellent adhesion to the glass improve the mechanical properties such as tensile strength, endurance for the deformation such as bending, flexibility, elongation, etc. and somewhat dissolve the disadvantages when using them as a cover for the optical glass fiber by melt extrusion. However, the optical fibers thus coated have much uneven characteristics and the mean values and the minimum values of their mechanical strength are still low although considerably enhanced as compared with those of the uncovered optical glass fiber.

In case of making the optical glass fibers into a cable for use with the optical transmission, each of the fibers is subjected to the repeated operations of twisting, assembling and taking up and applied with a great external force when it is handled, transported and worked in cable laying operation. An external force giving a certain deformation is large among others. The elongation of glass at break is of an order of 0.1% which is far from withstanding such external force. Considering that copper conductors conventionally used for the communication lines have the elongation of the order of several tens in percentages, the above value is quite low. In addition to it, it is required that the unit length of the optical transmission cable is as long as several hundreds to thousands meters in an optical transmission system in order to minimize the optical losses in the joint portions. This necessitates more uniform characteristics along the length and the minimum values in said unit length, rather than the mean values, are required to be as high as possible than in the past. From such view points, it has been found that an optical transmission cable for use with a practical use can hardly be obtained by merely coating the optical glass fibers with the thermoplastic resin by means of melt extrusion and hence that further improvements in the mean values and the minimum values for the flexibility, elongation at break, tensile strength are necessary.

The inventors have made a further study for coating and baking a solution of a thermoplastic or thermosetting resin compositions. It has been found, as the result, that such coating and baking must be repeated for several times of cycles in order to obtain about 50 – 200 micron film thickness which are considered to be practical for attaining necessary properties, because film thickness obtained by one cycle of coating and baking should be restricted usually to the order of several microns in order to avoid troubles such as blistering. This makes the operation very complicated and requires large facility. Also, in the cycles repeated for several tens of times, large tensile strength, torsion, bending, impact strength, etc., are likely to apply and, therefore, frequently cause defects such as breaks, cracks and the like to the optical glass fibers. Thus it is necessary for industrially practicing this method to reduce the velocity of the line much lower that of the covering by melt extrusion and use a facility of extremely high accuracy, which possibly increases the manufacture costs significantly and even makes the fabrication of the facility impossible. Further, since the resin composition should be dissolved or dispersed in solvents, those resins that can neither be dissolved nor dispersed into the solvents can not be used. Either of the covering by melt extrusion or coating and baking method was shown to be of little practical value from the foregoings.

For obtaining an optical transmission fiber having high mechanical properties both in mean values and minimum values, excellent in mechanical and optical stabilities and capable of being manufactured easily, the inventors have further studied in various approaches for the structures and method of manufacture of such optical fibers and now found that the above objects can be attained by an optical transmission fiber which has a characteristic structure manufactured by a method described hereinafter. According to the present invention, it is found that by coating and baking at first, in one or several layers, a liquid resin composition or a solution or dispersion obtained through dissolving or dispersing a liquid or solid resin composition into a solvent on an optical glass fiber and then covering thereover by melt extrusion one or several layers of thermoplastic resin composition, an optical transmission fiber can be obtained which is improved with respect to the foregoing defects (A) and (B) for optical glass fibers and hence much enhanced both with the mechanical and optical properties in the minimum value of each property, excellent in stability and can easily be manufactured. According to the present invention, it is further found that a great advantage can be obtained as seen in Example 2 described later that a tough and flexible optical transmission fiber can be manufactured even using, as thermosetting resin composition for covering by melt extrusion, those resins having no polar or functional groups and of poor adhesion to the glass such as polyethylene, polypropylene, etc.

Surprisingly, it was also found that outstanding improvements in the properties can be obtained by carrying out the above described process for coating and baking the liquid resin composition, immediately after the melt drawing process for the glass fiber and prior to the contact of the drawn glass fiber to solid bodies such as a guide reel, drum, etc. (that is, in a so-called tandem manner).

According to the present invention, a coated and baked layer of a resin composition, preferably, of a resin composition having good adhesion to the glass is formed on an optical glass fiber and a thermoplastic resin composition of high elongation and excellent flexibility is coated thereover by extrusion, which enables one to form a desired film thickness in a simple operation of coating and baking-application of a cover by melt extrusion and thus produces an optical transmission fiber excellent in mechanical strength, flexibility and high durability for the deformation.

The reasons for such significant improvements with respect to the above defects and enhancements in the properties in the present invention are considered as follows.

1. The viscosity of the resin composition for coating and baking can be reduced remarkably by the use of a liquid resin composition or a solution or a dispersion obtained through dissolving or dispersing a liquid or solid resin composition in a solvent, and such viscosity can also be lowered significantly by increasing a temperature at the time of baking operation. This provides much more preferred wetting to the surface of glass as compared with a case where the surface is directly covered with a molten resin composition of extremely high viscosity, and even when cracks or unevenesses are present on the surface of glass the resin composition can enter to some extent into them to insure the uniform and sufficient close contaction between the resin composition and the surface of glass.

2. The resin composition for coating and baking contains polar or functional groups in the molecules which, it is supposed, interact with the chemical bond; Si — OH existing on the surface of glass, for example, by way of hydrogen bond to cause a strong adhesion thereby increasing the strength due to a positive composite effect. Also, it may be that when a thermosetting resin composition is used as a resin composition for coating and baking, reactive groups in the molecules of the thermosetting resin may possibly react with hydroxyl groups existing on the surface of glass thereby increasing the adhesion.

3. When the coating and baking process for above mentioned liquid resin composition is arranged in a manner tandem to the drawing process for the optical glass fiber, it is considered that the surface of the glass fiber is kept at a condition where it still clean and possesses a high surface energy and, therefore, easily wetted with liquid resin composition. Accordingly, a coated film very firmly bonded to the glass surface can be formed on the said surface by coating and baking, which protects the surface of the glass fiber and prevents cracks from growing on the glass surface thereby enabling it to possess high initial properties of the glass fiber immediately after the spinning.

4. As stated above, a fiber formed by providing one or more layers of thin coated and applied films on an optical glass fiber is still of small diameter and incovenient to handle and has not sufficient strength capable of withstanding the cable making work, and deformation, and flexibility, but the fragility is much reduced as compared with an individual optical glass fiber. In addition, it is conceivable that since the coated and baked film serves as a protection film, the adverse effect of atmospheric moisture, dusts, etc which is said to decrease the strength of the glass fiber can be reduced and also the cracks can be kept from forming on the surface in the later treatment. Further it is believed that by using a resin composition of a high adhesion property as a layer for coating and baking, when a cover of thermoplastic resin composition of excellent flexibility is applied by melt extrusion in the later processes, a firm bonding can be formed between the optical glass fiber and said resin composition by way of the coated and baked film to provide a flexibility to the optical glass fiber, together with a synergistic composite effect resulted from the combination of the optical glass fiber and the resin composition thereby providing a very tough and flexible optical transmission fiber.

Further, according to the present invention, the adverse effect of leaking light in and between each of the optical glass fibers as well as those of the reflection at the interface that are previously referred to as (C) of the aforesaid disadvantages for optical glass fibers can be eliminated by properly selecting the refractive index of the resin composition to be coated and baked just over the optical glass fiber and that of the thermoplastic resin composition to be applied thereover as a cover by melt extrusion.

Referring, for example, to a clad type shown in FIG. 2, a core 1 is sequentially surrounded on its outer surface with a clad 2, a layer 6 of a resin composition coated and baked in close contaction thereover, and a layer 7 of a thermoplastic resin composition. Providing that refractive indexes of the resin composition layers 6 and 7 are $n6$ and $n7$ respectively and that of the clad 2 is $n2$, and selecting the resin composition and glass so that the following relation:

$$( N6 , n7 \geqq n2 ) n6 \geqq n2 \text{ and } n7 \geqq n2$$

can be satisfied, then the reflection of the leaking light from the clad 2 at the interface between the clad 2 and the resin composition layer 6 is zero or only a little surface reflection. The leaking light is therefore prevented from entering the core 1 thereby eliminating the adverse effects such as distortion in pulses. It can easily be proved by Snell's law that even when $n6$ is greater than $n7$ the leaking light from the resin composition layer 6 at the interface between the resin composition layer 6 and the resin composition layer 7 is zero or only a little surface reflection only if the relation; $n7 \geqq n2$ is satisfied.

In addition to the problems (A) and (B), the problem (D), that is, for the intrusion of the leaking light from one optical glass fiber to others, or the further intrusion of the external light to the inside can be prevented by using, as one or more layers in the covering layer, those containing materials capable of absorbing light of all over the wave lengths such as carbon black or ones selectively absorbing the light of wave lengths to be used for the optical transmission such as pigments, dyes and the like.

It is most desirable to improve both of the problems (C) and (D) related to each other by using such light absorbing layers and selecting various components so that the above relation; $n6, n7 \geqq n2$ ($n6 \geqq n2$ and $n7 \geqq n2$) can be satisfied.

The resin compositions for coating and baking used in this invention include one or more of said resins alone or in admixture with one or more additive resin, curing agent, curing accelerator, crosslinker, reactive diluent, filler carbon, adhesion improvers of, for example, silane coupling agents and the like or the mixture thereof. Liquid resin composition includes herein a resin composition which is liquid at normal temperature, as well as the mixture of one or more of the reactive monomers with any one or combination of curing agent, curing accelerator, additive resin, reactive diluent, filler carbon, adhesion improver and the like that are liquid at normal temperature.

In applying and baking these resin compositions, the liquid resin is used as it is or, if the viscosity thereof is high, dissolved or dispersed in an appropriate solvent and the solid resin is dissolved or dispersed in an appropriate solvent and then used for coating and baking. Among others, those resins compositions having uniform and high adhesion to the glass are preferred for the coating and baking layer and most preferred are those further having uniform and high adhesion also to the layer of the thermoplastic resin composition to be provided thereover. The resin as a basic ingredient in the resin composition used herein can be of any types such as thermoplastic, thermosetting types and the likes and, from the view point of the adhesion to the glass fiber, includes, for example, polyester, polyamide, polyacetal, polyvinylacetal, polysulfone, polyurethane, polyether, polyesterimide, polyamideimide, polyimide, polyacrylate, polyvinylacetate, ethylenevinylacetate copolymer, ethylene-acrylic acid copolymer, epoxy resin, phenol resin, resorsinol resin, unsaturated polyester resin, urea resin, furan resin, silicone resin, alkyd resin, melamine resin, diallylphthalate resin, etc. or the derivatives thereof, those containing polar or functional groups in the molecules being generally preferred. The polar or functional groups means herein

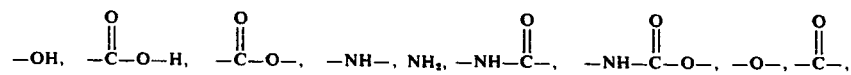

and the like. More preferred resins among others are thermosetting resin such as epoxy resin, phenol resin, unsaturated polyester resin, silicone resin, alkyd resin, furan resin, urethane resin, diallylphthalate resin and the likes, and the thermoplastic resins such as phenoxy resin, polyvinylacetal resin, polyester resin, polyacrylate resin, polyesterimide resin and the likes, as well as their derivatives all of which being excellent in adhesion to glass. The excellent adhesion is considered, with respect to the thermosetting resin, attributable to their reactive nature with —OH group on the surface of the glass and it is also supposed that —OH groups, ester bonds, etc. in the resin molecules act effectively for the sake of the improved adhesion. The resins of this type have, among other resins, relatively high elastic modulus of more than 200 kg/mm$^2$ and on the contrary a lower thermal expansion coefficient and, therefore, they have the properties close to those of the glass relative to the effect given from the outside such as external force, heat, and the like. It is supposed that they provide stepwise changes between the glass fiber and the melt extrusion layer of thermoplastic resin to be described hereinafter thereby moderating the excess concentration of the stress and the thermal effect. Particularly, it is found that epoxy resin, unsaturated polyester resin obtained by modifying the epoxy resin, phenoxy resin, etc. are preferred in view of the properties of the coated fiber.

Where the process for coating and baking the liquid resin composition is carried out in tandem to the drawing process for the glass fiber, unsaturated polyester resin composition, in particular, those containing as a basic ingredient unsaturated polyester resin produced by the reaction of epoxy resin and unsaturated carboxylic acid or unsaturated carboxylic acid anhydride are preferred. Since the above described resin compositions have both of the properties of a higher adhesion property to the glass attributable to epoxy resin and of the fast curing property of the unsaturated polyester due to the reactions of peroxides and vinyl monomers, the coating and baking process can be performed rapidly and the properties after said process are similar to those of epoxy resins. Therefore, in coating and baking these resin compositions immediately after the drawing process for the glass fiber and prior to the contact with solid objects such as a guide reel, take up drum and the like, neither significant delay for the line speed nor the provision of a longer baking furnace is required, thereby enabling the processing in a compact facility and providing high workabilities. These embodiments are illustrated practically in Examples 7 and 8. In addition to these unsaturated polyester resins, other resin compositions comprising as a basic ingredient epoxy resin, phenol resin, phenoxy resin, silicone resin, polyvinylacetal resin, polyacrylate resin, etc. can of course provide similar advantageous effects due to the tandem system by using a facility suited to the baking velocity for the resin and depending upon the baking conditions.

The above described resins can be blended with each other or added with silane coupling agents such as γ-glycidoxypropyltrimethoxysilane, γ-aminopropyltriethoxysilane, etc. methacrylate chromic chloride (known under the commercial name of Volan), tetraalkyltitanate or the derivatives thereof to improve the adhesion between the glass and resin. As can be seen in fact in Example 4, it is found that a system added with silane coupling agents is more improved in the properties than in the system without such addition.

The thermoplastic resin for use with a coated layer 7 shown in FIG. 2 in this invention includes thermoplastic resin alone or in admixture with any or all of the additive resin, inorganic filler, organic filler, crosslinker, pigment, dye which are capable of being applied as a cover by melt extrusion (a method of melting in a screw type extruder and extruding through wire coating die to apply a cover or a method of melting the resin composition by some means and extruding the same by a gear pump to effect covering).

The thermoplastic resin suitable for this process includes almost all of the thermoplastic resins and preferred, among others, are polyamide, polyester, polycarbonate, polyurethane, polyurea, polyhydantoin, polysulfone, polyether, polyesterimide, ionomer resin, polyvinyl polyethylene, polypropylene, ethylenevinylacetate copolymer, acrylonitrile-butadiene-styrene terpolymer, chlorinated polyethylene, ethylene-acrylic acid copolymer, urethane rubber, polychloroprene, ethylene-propylene rubber, chlorosulfonated polyethylene and the like. All of the above resins have much higher elongations as compared with thermosetting resin and glass, and when arranged in the construction of the present invention, they are sufficiently combined with the glass fiber by way of a layer of resin composition to be coated and baked having good adhesion to the optical glass fiber to provide deforming ability, flexibility, etc. to said fiber which lacks such properties thereby resulting a synergistic composite effect as a whole to produce a tough and flexible optical transmission fiber.

Furthermore, the refractive index of each of the resin compositions above described for the coated layers 6 and 7 is higher than the refractive index (about 1.46) of glass comprising quartz as a basic component, and thus the aforesaid disadvantage (C) can be overcome by employing such a resin composition.

The Example 1 set forth in Table 1 describes an optical transmission fiber in which thermoplastic type phenoxy resin is used as a layer 6 and 12-nylon as a layer 7 and, in this embodiment, both of the breaking load and the elongation are improved by a degree of 30 – 40% as compared with an optical transmission fiber shown as a comparison example 1 in which 12-nylon is directly applied by melt extrusion as a cover onto an optical glass fiber as well as compared with an optical glass fiber of comparison example 5. Particularly the improvement in the minimum values exceeds 50% showing that the layer 6 significantly contributes to the improvements in the stability as well as in the properties of the fiber. In example 3, thermosetting type phenol resin is used for the layer 6 and 12-nylon as a layer 7, and improvements both of the breaking load and elongation are observed for the means values and a minimum values. All of the fibers can withstand bending for up to several times of the diameters showing that the ease of the handling is astonishingly improved.

On the contrary, as in comparison example 4, where the same phenol resin is coated an baked for all of the layers (refer to Table 2), elongation is as low as 1.10% and flexibility is insufficient although the breaking load is 2.54 Kg and about the same order as in the comparison example 1 in which 12-nylon is used as a coating and this is considered not suitable for the improvement of an optical glass fiber which has the defects of high modulus and fragility. Surprisingly, it is also demonstrated that while a polyethylene cover layer having poor adhesion to the glass and which is merely applied as a cover by melt extrusion onto the glass can neither provide practical mean values nor minumum values as shown in the comparison example 2, the use of thermosetting type epoxy resin as the layer 6 between the glass and the polyethylene as in Example 2 remarkably improves both the breaking load and the elongation in mean values and in minimum values showing that the improvement exceeds indeed 100%.

As stated above, all of the resins used for the layer 6 have —OH groups in the molecules and are excellent in the adhesion to the surface of glass and, in addition, they have a high elastic modulus and low thermal expansion coefficient to exhibit natures laying between those of the glass and the coating layer 7 applied by melt extrusion. Thus it is conceivable that remarkable positive composite effects can be obtained as a whole which greatly contributes to the improvements in the properties.

Further improvements in the properties are obtained by using phenoxy resin in example 1 blended with silane coupling agents as shown in example 4 and it is supposed that presence of said silane coupling agents are responsible for the improvement in the adhesion.

Examples 5 and 6 illustrate embodiments wherein resin compositions, as for example the layer 6 in FIG. 2 are used in which epoxy resin is modified to introduce unsaturated bonds in the molecules so that curing can be effected in a similar manner to unsaturated polyester and, in these embodiments, the improvements in all of the properties can be observed as compared with those in which 12-nylon or tetramethylene terephthalate resin is applied alone as a layer 7 in FIG. 2.

It was further surprising that in example 7 and 8, wherein the same resin compositions are coated and baked in a manner tandem to the drawing process for glass fiber, outstanding improvements in the characteristics can be seen and an extremely excellent fiber can be obtained having both toughness and flexibility. In these embodiments, a high strength can already be shown at the end of coating and baking the layer and this is considered that a high initial property of the glass fiber is preserved by the coating and baking process arranged in tandem to the drawing process.

An optical transmission cable can be produced by combining a plurality of individual optical glass fibers according to the present invention and each of the fibers in the cable can be distinguished by incorporating pigments, dyes, coloring fillers, etc. in either or both of the thermoplastic resin compositions partially or wholly, or the surface of the optical transmission fiber obtained according to the present invention can be tinted with dyes or painted with coloring inks or coloring paints. The optical transmission cable can further comprise feeding line, monitor line, linear reinforcement, emergency communication line, etc. as required in addition to said optical transmission fibers.

In the following working examples and comparison examples, breaking loads and elongation at break were measured using a tensile strength tester (manufactured by Instron Co., U.S.A.). The tensile velocity and the length of the specimens (distance between chucks) are 5mm/min and 100mm respectively, and the numbers of the specimens used per example were 25 the means values and the minimum values of which being shown in Table 1 and 2. The minimum bending diameter is determined based on the averages for 20 pieces by measuring the minimum diameter at which the test piece was broken as it was being bent under no tension condition. The breaking load, elongation and the minimum bending diameter are shown as values that were indicated when both or either of the optical glass fibers and the coating layers thereover were broken. Usually, optical glass fibers were broken at first or both of them were simultaneously broken.

EXAMPLE 1

A clad type optical glass fiber of 200 $\mu$ diameter containing as a basic ingredient quartz glass is washed with butylcarbitol and then a solution prepared by dissolving phenoxy resin (PKHH manufactured by Union Carbide Corporation, U.S.A.) in a butyl carbitotol to a resin content of 20%w was coated thereon and baked. The coating was effected in a liquid tank containing the above solution and through a die of 0.30mm diameter and a tubular furnace of two meter length was used for the baking with the baking temperature being 270° - 330°C. The line velocity was 60 cm/min. and the film thickness formed per cycle of coating and baking was 6 $\mu$.

Then the fiber thus coated and baked was supplied with a cover of molten 12-nylon (manufactured by Hüls AG Germany) by way of drawing it at a resin temperature of 235°C through a die and then immediately cooled by water to produce an optical transmission fiber.

The optical transmission fiber was very flexible and had a toughness such that it was not broken when bent as far as several times of its diameter. The tensile property and the bending property of this optical transmission fiber are shown in table 1.

EXAMPLE 2

A clad type optical glass fiber of 200 $\mu$ diameter containing as a basic ingredient quartz glass was washed with butylcellosolve, and a solution of epoxy resin (manufactured by Shell Chemical Co., under the trade name of Epicote 828), diaminodiphenylmethane and butylcellosolve dissolved with each other in a weight ratio of 37:11:52 was coated and baked onto said fiber. The coating was effected through a die of 0.30 mm diameter and a two meter length tubular furnace was used for the baking. The coating and baking was effected for once at a temperature condition of 220°C - 270°C and with a line velocity of 60 cm/min. The film thickness obtained was 10 $\mu$.

Then the fiber thus coated and baked was supplied with a cover of low density polyethylene (Sumikathene E 209, manufactured by Sumitomo Chemical Industries Co.) by extruding through a tubing type die and point under reduced pressure to produce an optical transmission fiber. The fiber thus obtained was very flexible and not broken as it was bent as far as several times of its diameter. The tensile property and the bending property of the optical transmission fiber are shown in Table 1.

EXAMPLE 3

A clad type optical glass fiber of 200 $\mu$ diameter containing as a basic ingredient quartz glass was coated with phenol resin (Sumilite Resin PR–961A, manufactured by Sumitomo Durez Co., Ltd.) and then baked. The coating was effected by directly immersing the fiber in a liquid bath and then removing upward without using a die. The baking was effected in a tubular furnace of two meter length at a temperature of 140° - 190°C with a line velocity of 20 cm/min. The film thickness produced was 5 $\mu$. The fiber thus obtained was supplied with a cover of molten 12-nylon (Hüls AG Germany) by drawing from the nylon at a resin temperature of 235°C and through a die and then immediately cooling to produce an optical transmission fiber. The tensile property and the bending property of the fiber are shown in Table 1.

EXAMPLE 4

A clad type optical glass fiber of about 200 μ diameter containing as a basic ingredient quartz glass was washed with butylcarbitol. Phenoxy resin (Manufactured by Union Carbide Corporation in U.S.A.) was dissolved into a butylcarbitol to a resin content of 20%w and blended with γ-glycidoxypropyltrimethoxysilane of 3%w, and the blend was coated onto said fiber and baked. The coating and baking was effected by drawing the glass fiber through a die of 0.30 mm diameter in a liquid tank containing the above solution and baked in a two meter length tubular furnace. One cycle of the coating and baking was effected with the temperature conditions of 270°C – 330°C and the line velocity at 60 cm/min. The film thickness obtained was 6 μ.

Then the fiber was supplied with a cover by drawing it from molten 12-nylon (Hüls AG Germany) through a die and then directly cooling with water to produce an optical transmission fiber.

The optical transmission fiber thus produced was very flexible and tough and it was not broken when bent as far as several times of its diameter. The tensile property and the bending property of the optical transmission fiber are shown in Table 1.

EXAMPLE 5

An unsaturated polyester resin composition was coated onto a clad type optical glass fiber of 180 μ diameter containing as a basic ingredient quartz glass and baked. The unsaturated polyester resin composition comprises here 5 parts of benzoyl peroxide to 100 parts of a mixture of unsaturated polyester resin produced by the reaction of an epoxy resin synthesized from methylepichlorohydrin and bisphenol-A with unsaturated carboxylic acid or satutated carboxylic acid, and styrene (Dicklite UE–1150, manufactured by Dainippon Ink & Chemicals Inc.) The resin content in the above composition was about 70%. The coating was effected by drawing upwardly the above glass fiber through a liquid tank containing the above resin composition and subjecting it to a felt squeezing. The coated fiber was then passed through a tubular furnace of two meter in length and then baked at a temperature of 280°– 350°C. The line velocity was 12 m/min. The optical glass fiber thus obtained having a thin coated and baked layer (of about 8 μ thickness) was covered with 12-nylon by melt extrusion, wherein the line velocity and the resin temperature were 20 m/min. and 235°C respectively and the fiber was passed through a tubing type die and point to shape its outer configuration under a reduced pressure and then cooled with water.

The tensile property and the bending property of the optical transmission fiber thus obtained are shown in Table 1.

EXAMPLE 6

An epoxyacrylate resin composition was coated on a clad type optical glass fiber of about 200 μ diameter containing as a basic ingredient quartz glass and baked. The epoxyacrylate resin composition here comprises 5 parts of benzoyl peroxide to 100 parts of a mixture of unsaturated polyester having unsaturated bonds at the terminal ends of the molecules which are produced by the reaction of diglycidyether of bisphenol-A with esters of acrylic acid and methacrylic acid, and styrene (manufactured by Showa Highpolymer Co. Ltd. as Ripoxy R–840). The coating and baking was effected by using same apparatus as in example 5 and at a furnace temperature of 300°C and with a line velocity of 10 m/min. The optical glass fiber thus obtained having a thin coated and baked layer (of about 7 μ in thickness) was supplied with a cover of tetramethyleneterephthalate resin (PBT resin, manufactured by Toray Co.) by melt extrusion, wherein the line velocity and the resin temperature were 30 m/min. and 245°C respectively and the fiber was passed through a tubing type die and point to shape its outer configuration under a reduced temperature and then air cooled. The tensile property and the bending property thus obtained are shown in Table 1.

EXAMPLE 7

An unsaturated polyester resin composition (Dicklite UE–1150 Manufactured by Dainippon Ink and Chemicals Inc.) as in example 5 was coated and baked on a clad type optical glass fiber of about 180 μ diameter containing as a basic ingredient quartz glass, immediately after the drawing of said glass fiber. The material for the optical glass fiber was shaped as a rod of 10 mm diameter and it was melted in a high frequency furnace drawn to a diameter of 180 μ. When it was vertically pulled down below said furnace by about 400 mm, it was passed through a liquid tank containing the above described resin composition and coated therewith, and then baked in an electric tubular furnace of about 700 mm length arranged about 300 mm below said liquid tank. The line velocity was 20 m/min. and the furnace temperature of said baking furnace was 350°C.

The optical glass fiber thus obtained having a thin coated film of the resin composition (shown as layer 6 in FIG. 2) was quite free from fragility as compared with original glass fiber and not broken when wound around a rod of 2 mm diameter. Then, the optical glass fiber having the thin coating of the resin composition was supplied with a cover of 12-nylon (Daiamid L-1640, by Daicel Hüls Ltd.) by melt extrusion, wherein the line velocity for the covering by extrusion and a resin temperature were 20 m/min. and 235°C respectively and the fiber was shaped with its outer configuration through a tubing type die and point under a reduced pressure and then water cooled. The tensile property and the bending property of the optical glass fiber thus obtained are shown in Table 1. The bending diameter of the fibers were less than 5 mm for all of the tested specimens.

EXAMPLE 8

A composition of epoxyacrylate resin (Ripoxy R-840 manufactured by Showa Highpolymer Co. Ltd.) as in the example 6 was coated and baked on a clad type optical glass fiber of about 200 μ diameter containing as a basic ingredient a quartz glass, immediately after the drawing of said glass fiber. The conditions or the coating and the baking were the same as in example 7. The optical glass fiber thus obtained having a thin coated and baked layer (depicted as 6 in FIG. 2) had no fragility at all as compared with the original glass fiber and not broken when wound around a rod of 3 mm diameter.

Then, the glass fiber having a coated and baked layer thus produced was covered with tetramethyleneterephthalate resin (manufactured by Toray Co.) by melt extrusion, wherein the line velocity and the resin temperature were 30 m/min. and 245°C respectively and the fiber was shaped with its outer configuration through a tubing type die and point under a reduced pressure and then air cooled. The tensile property and the bending property of the optical transmission fiber are shown in Table 1. The bending diameter of these fibers were less than 5 mm for all of the tested specimens.

COMPARISON EXAMPLE 1

A clad type optical glass fiber of about 200 μ diameter containing as a basic ingredient quartz glass was covered with molten 12-nylon (manufactured by Hüls AG Germany) through a die and then immediately cooled with water to produce an optical transmission fiber.

The tensile property and the bending property of the optical transmission fiber are shown in Table 2.

COMPARISON EXAMPLE 2

A clad type optical fiber of about 200 μ diameter containing as a basic ingredient quartz glass was supplied with a cover of low density polyethylene (Sumikathene, manufactured by Sumitomo Chemical Industries Co.) by extruding it through a tubing type die and point under reduced pressure to produce an optical transmission fiber.

The tensile property and the bending property of said glass fiber are shown in Table 2.

COMPARISON EXAMPLE 3

A clad type optical glass fiber of about 200 μ diameter containing as a basic ingredient quartz glass was supplied with a cover of tetramethyleneterephthalate resin by melt extrusion wherein the line velocity and the resin temperature were 30 m/min. and 245°C respectively and the fiber was passed through a tubing type die and point to shape its outer configuration under reduced pressure and then air cooled. The tensile property and the bending property of the optical transmission fiber thus obtained are shown in Table 2.

COMPARISON EXAMPLE 4

A clad type optical glass fiber of about 200 μ diameter containing as a basic ingredient quartz glass was coated with phenol resin (Sumilite Resin PR-961A, manufactured by Sumitomo Durez Co. Ltd.) and then baked. The coating and baking was effected by directly immersing the glass fiber into a liquid tank and then removing upwardly without using a die, and then baked in a tubular type furnace of two meter length at a furnace temperature of 140° – 190°C and with a line velocity of 20 cm/min. The coating and baking process was repeated for 10 cycles.

The tensile property and the bending property of the optical transmission fiber are shown in Table 2.

COMPARISON EXAMPLE 5

The tensile properties and the bending property of the clad type optical glass fibers containing as a basic ingredient quartz glass which were subjected to melt drawing in the same conditions as for the glass fibers used in Examples 1 – 8 and comparison examples 1 – 4 were measured and the results are shown in Table 2.

Table 1

| | Outer diameter (μ) | Breaking load* (kg) | Elongation* (%) | Minimum bending dia (mm) | Covering resin** |
|---|---|---|---|---|---|
| Example 1 | 535 | 3.34 | 1.77 | 5 | 12-nylon |
| | | 2.05 | 1.13 | | phenoxy resin |
| Example 2 | 1150 | 3.35 | 1.85 | 5 | low density polyethylene |
| | | 2.16 | 1.42 | | epoxy resin |
| Example 3 | 524 | 3.01 | 1.57 | 8 | 12-nylon |
| | | 2.31 | 1.25 | | phenol resin |
| Example 4 | 531 | 3.83 | 1.91 | 4 | 12-nylon |
| | | 2.36 | 1.25 | | phenoxy resin (containing silane coupling agent) |
| Example 5 | 556 | 2.91 | 1.29 | 7 | 12-nylon |
| | | 2.11 | 0.95 | | unsaturated epoxy resin |
| Example 6 | 565 | 3.23 | 1.38 | 7 | tetramethyleneterephthalate resin |
| | | 2.13 | 1.00 | | epoxyacrylate resin |
| Example 7 | 469 | 6.10 | 2.73 | <5 | 12-nylon |
| | | 2.50 | 1.22 | | unsaturated epoxy resin |
| Example 8 | 565 | 4.23 | 1.80 | <5 | tetramethyleneterephthalate resin |
| | | 3.02 | 1.31 | | epoxyacrylate resin |

*Figures in the upper rows represent mean values and in the lower row represent the minimum values.
**The resins in the upper rows are for the layer 7 and in the lower rows are for the layer 6 in FIG. 2.

Table 2

| | Outer diameter (μ) | Breaking load* (kg) | Elongation* (%) | Minimum bending dia (mm) | Covering resin |
|---|---|---|---|---|---|
| Comparison example 1 | 528 | 2.54 | 1.25 | 10 | 12-nylon |
| | | 1.34 | 0.69 | | |
| Comparison example 2 | 1150 | 1.68 | 1.06 | 17 | low density polyethylene |
| | | 0.81 | 0.50 | | |
| | | 2.73 | 1.16 | | tetramethylene terephthalate resin |
| Comparison example 3 | 536 | | | 10 | |
| | | 1.85 | 0.78 | | |
| Comparison example 4 | 500 | 2.54 | 1.10 | 11 | phenol resin |
| | | 1.86 | 0.81 | | |
| | | 1.12 | 0.53 | | an original glass fiber for optical transmission |
| Comparison example 5 | 200 | | | 23 | |
| | | 0.72 | 0.30 | | |

*The figures in upper rows and the lower rows represent mean values and the minimum values respectively.

What is claimed is:

1. An optical transmission fiber which is formed by applying and baking a liquid resin composition or a solution or a dispersion prepared by dissolving or dispersing in a solvent a liquid or solid resin composition onto a glass fiber for optical transmission and, further, coating thereover by melt extrusion a thermoplastic resin composition.

2. An optical transmission fiber as claimed in claim 1, wherein a step for coating and baking a liquid resin composition or a solution or a dispersion prepared by dissolving or dispersing a liquid or solid resin composition in a solvent is performed immediately after the drawing for an optical transmission glass fiber and before the contact of said glass fiber with other solid objects.

3. An optical transmission fibers as claimed in claim 1, wherein the refractive index of each of the resin compositions is equal to or more than the refractive index of the outer portion of said optical transmission glass fiber.

4. An optical transmission fiber as claimed in claim 1, wherein the resin as a basic ingredient in the resin composition to be coated and baked has in its molecules polar or functional groups comprising anyone of

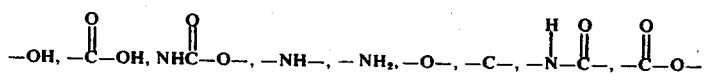

5. An optical transmission fiber as claimed in 1, wherein the resin composition to be coated and baked has an elastic modulus more than 200 kg/mm² after the coating and baking thereof.

6. An optical transmission fiber as claimed in claim 1, wherein the resin as a basic ingredient in the resin composition to be coated and baked contains -OH groups in its molecules.

7. An optical transmission fiber as claimed in claim 1, wherein the resin as a basic ingredient in the resin composition to be coated and baked comprises epoxy resins or epoxy resin derivatives.

8. An optical transmission fiber as claimed in claim 1, wherein the resin composition to be coated and baked contains as a basic ingredient unsaturated polyester resin produced by the reaction of epoxy resin with unsaturated carboxylic acid or unsaturated carboxylic acid anhydride.

9. An optical transmission fiber as claimed in claim 1, wherein the resin composition to be applied and baked contains therein silane coupling agents.

10. An optical transmission fiber as claimed in claim 1, wherein said glass fiber is a clad type glass fiber.

* * * * *